Figure 1:
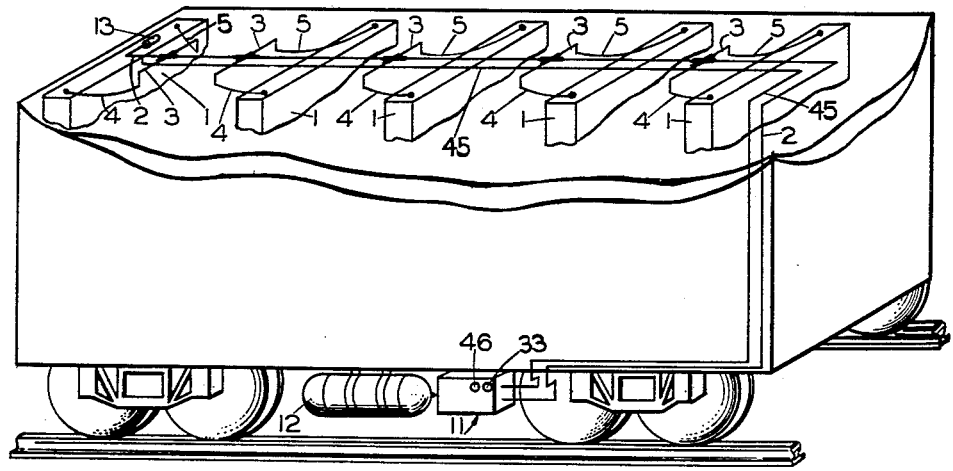

Nov. 22, 1960           J. R. PIER ET AL           2,960,942
PRESSURIZATION CONTROL SYSTEM FOR INFLATABLE
DUNNAGE BAGS USED IN FREIGHT CARS
Filed Sept. 29, 1958

INVENTOR.
JEROME R. PIER
WILLIAM S. JOHNSTON
BY
Aelbert A. Steinmiller
ATTORNEY

United States Patent Office

2,960,942
Patented Nov. 22, 1960

2,960,942

PRESSURIZATION CONTROL SYSTEM FOR INFLATABLE DUNNAGE BAGS USED IN FREIGHT CARS

Jerome R. Pier, Trafford, and William S. Johnston, Pittsburgh, Pa., assignors to Westinghouse Air Brake Company, Wilmerding, Pa., a corporation of Pennsylvania Filed Sept. 29, 1958, Ser. No. 764,193

7 Claims. (Cl. 105—369)

This invention relates to systems and methods for controlling the pressure of gas in a plurality of inflatable dunnage members, such as in the form of "air mattresses," that are chargeable with gas under pressure from a common control pipe and are interposed between cargo units in a freight-carrying conveyance and inflated, after loading of all cargo units, to fill the void between such cargo units and thus prevent shifting of, and damage to, said cargo units in event of shock impacts to the conveyance during transit.

It has heretofore been proposed to provide air-mattress-type dunnage members having a cargo-engageable area of approximately 9200 square inches and to inflate said dunnage members to a preselected pressure of between about ½ p.s.i. and 3 p.s.i., selected according to the nature of the cargo. For instance, this preselected pressure will be considerably lower for relatively light cargo units with fragile containers than for heavy cargo units such as refrigerators. If dunnage members of this area are charged with air at the preselected pressure at the loading point and no means are provided for maintaining this pressure constant, the shoring force exerted by the inflated dunnage members on the cargo units will vary 575 pounds for each ounce per square inch change in pressure in the dunnage member, will vary about 4600 pounds for each inch of mercury change in barometric pressure due either to weather changes or changes in altitude, and will vary about 1% for each 6° Fahrenheit change in ambient temperature. Thus, if the air pressure in the dunnage members should increase even very slightly during transit, the cargo may be crushed, whereas if such pressure should reduce even slightly the cargo may be inadequately shored and thus be able to shift and become damaged.

The principal object of this invention is therefore to provide an improved control system and method for preadjusting the preselected pressure to be employed in the dunnage members and thereafter sensitively maintaining said dunnage members charged with gas at said preselected pressure irrespective of changes in ambient temperature and/or in barometric pressure due to variations in weather or altitude during transit.

According to this object, the improved pressure control system comprises control valve means for automatically supplying gas under pressure to, bottling up gas under pressure in, and releasing the same from the control pipe and thus the dunnage members as may be necessary from time to time constantly to maintain the gas pressure in said dunnage members at a preselected pressure selected as suitable for the character of the cargo being shored. The system also preferably comprises means such as an interlock valve which is movable to a calibrating position in which the control valve means is disconnected from the control pipe and is connected to a calibrating volume so that the control valve means may be sensitively preadjusted to maintain a desired preselected pressure. The system also preferably comprises a by-pass valve to permit rapid initial charging of the dunnage members in bypass of the sensitive control valve means and thus save time during shoring of the cargo in the conveyance; a pressure relief valve which is operative to vent gas under pressure from the control pipe and thus from dunnage members if the pressure therein should tend to increase more than a chosen slight degree above the preselected pressure; and a release valve to enable large capacity venting of the dunnage members in bypass of the control valve means and thus save time when the cargo is to be unloaded at destination.

Figure 2:
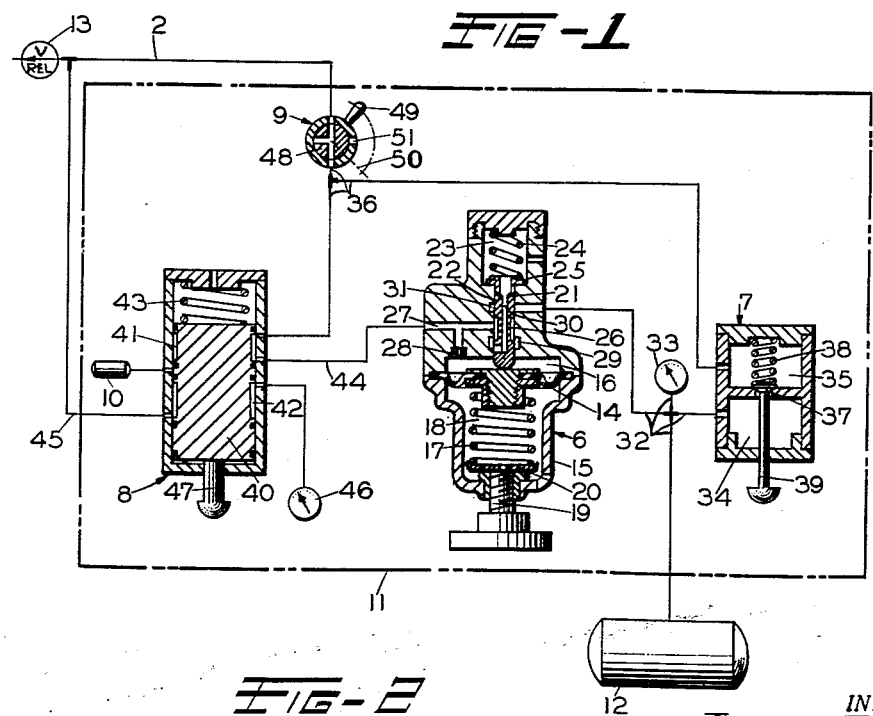

Other objects and advantages will become apparent from the following more detailed description of the invention and from the accompanying drawing, wherein:

Fig. 1 is a perspective view, partially cut away, of a freight car which is provided with a pressure control system embodying the invention; and Fig. 2 is a diagrammatic view showing, to enlarged scale, the various components of said control system.

*Description*

It has heretofore been proposed to provide a freight car equipped, as shown in Fig. 1, with a plurality of rectangular air-mattress-type inflatable dunnage members 1 which extend transversely across substantially the full width of the interior of the car and are carried by hangers (not shown) that are rollable along two overhead transversely spaced guide tracks (not shown) extending lengthwise of the car, such that the dunnage members may be stacked at one end of the car when not in use and may be moved to any desired position along the length of the car during loading of the car. A pressure control pipe or manifold 2 extending longitudinally below the roof of the car has a plurality of transversely extending, longitudinally spaced branch pipes 3 to the respective outer ends of each of which are connected the respective one ends of quick-disconnect flexible hose couplings 4, 5. At their opposite ends these hose couplings 4, 5 are provided with valve means (not shown), preferably in the form of spring-pressed check valves, each of which is automatically and mechanically unseated only when the respective opposite end of the associated coupling is connected to a dunnage member 1; said check valves serving, when a coupling is not so connected, to prevent blow-down of fluid under pressure from the control pipe 2 to atmosphere.

According to the invention, there is provided for use with a dunnage arrangement of the type just described, an improved pressure control system for controlling the pressure of fluid in the control pipe 2 and thereby in the dunnage member 1. This system, as more fully shown in Fig. 2, comprises a self-lapping type control valve device 6 and preferably also comprises a by-pass valve device 7, an interlock valve device 8, a release valve device 9 and a calibrating volume 10, all of which are preferably (though not necessarily) contained within a box-type enclosure 11 that is rigidly secured to the car body and may be locked to prevent tampering with these devices while the car is en route. The system further comprises a reservoir 12 secured to the car body and also preferably comprises a pressure relief valve device 13 located at the remote end of the control pipe 2.

The self-lapping control valve device 6 is preferably of the balanced type comprising a movable abutment 14 reciprocable in a sectionalized casing 15 and subject opposingly to pressure of fluid in a delivery chamber 16 and to pressure of a helical regulating spring 17 in an atmospheric chamber 18. An adjusting screw 19 having screw-threaded engagement with the casing 15 bears against a dish-shaped seat 20 for spring 17 to permit the bias force of said spring to be manually adjusted, as desired, from the exterior of the casing. Arranged coaxially with movable abutment 14 is a cylindrical valve member 21 that has sealing slidably guided contact with the wall of an aligned bore 22 open at one end to delivery chamber 16 and at the opposite end to an atmospheric chamber 23. When the screw 19 is backed outwardly of the casing to reduce the force of spring 17 to a minimum, a helical bias spring 24 in chamber 23 will bias the valve member 21 to a release position, in which it is shown, and which is defined by contact of an enlarged head on said valve member with a shoulder 25 encircling bore 22. With valve member 21 in release position, an elongated annular cavity 26 in the exterior of said valve member connects a passage 27 leading to delivery chamber 16 via a baffle choke 28 with a valve-member-encircling chamber 29 that is constantly connected to atmosphere via a passageway 30 formed in the valve member and leading to atmospheric chamber 23, for thereby venting the delivery chamber 16; and cavity 26 is out of registry with a valve-member-encircling supply chamber 31 that is constantly connected to a supply pipe 32 leading to reservoir 12 and a gage 33.

The by-pass valve device 7 may comprise a sectionalized casing providing a casing partition separating an inlet chamber 34 open to a branch of supply pipe 32 from an outlet chamber 35 open to a pipe 36. A by-pass valve 37 contained in chamber 35 is normally held seated as shown, by a helical bias spring 38, but is unseatable against the force of said spring by a manually operable plunger 39 to provide large capacity flow of fluid under pressure from supply pipe 32 to pipe 36 in bypass of control valve device 6 under conditions hereafter to be described.

The interlock valve device 8 may comprise a spool-type interlock valve 40 reciprocably mounted in a sectionalized casing and having two axially spaced elongated annular cavities 41, 42 that are suitably isolated from each other and from the ends of the spool valve by O-ring seals. Valve 40 is biased by a helical bias spring 43 to a normal position, in which it is shown, and in which cavity 41 connects a pipe 44 leading to passage 27 of device 6 with a branch of pipe 36, and in which cavity 42 connects a pressure tap line 45 leading to the remote end of control pipe 2 with a sensitive (such as 0 to 5 p.s.i.) low pressure gage 46. By application of a spring-overcoming force to a manually operable plunger 47, valve 40 may be shifted to and held in a calibrating position, in which cavity 42 connects pipe 44 with the calibrating volume 10 and gage 46, and pipe 44 is cut off from pipe 36, and line 45 is cut off from gage 46.

The release valve device 9 may be in the form of a three-way cock 48 operative when a handle 49 is in a normal position, in which it is shown, to connect pipe 36 with control pipe 2 at a point ahead of the dunnage members 1, and operative when said handle is moved to a release position, indicated by reference numeral 50, to cut off pipe 36 from control pipe 2 and connect the latter to a vent port 51 for providing large capacity venting of gas from the control pipe and hence from the dunnage members in bypass of device 6.

*Operation*

Assume initially that the freight car is empty; that the dunnage members 1 are at one end thereof and in deflated condition; that the valve devices 7, 8 and 9 are in their respective normal positions in which they are shown in the drawing; and that the adjusting screw 19 of control valve device 6 has been withdrawn sufficiently to cause the spring seat 20 to engage the end wall of chamber 18 for reducing the force of spring 17 to a minimum and thus permitting bias spring 24 to shift the valve member 21 to its previously-defined release position, in which the delivery passage 27 and hence chamber 16 are cut off from the supply reservoir 12 and are connected to atmospheric chamber 23.

The car may then be loaded by placing a deflated dunnage member 1 against one end wall of the car, placing a cargo unit against the other side of said dunnage member, hooking up said dunnage member to the nearby hose couplings 4, 5, then placing another cargo unit against the opposite side of said dunnage member, placing another deflated dunnage member against the other side of said other cargo unit, and thus repeating the process, such that deflated dunnage members will be sandwiched with very slight clearance between adjacent cargo units and each connected to respective hose couplings 4, 5 and thus to the control pipe 2, in the manner heretofore proposed.

According to the invention, the pressure relief valve device 13 is adjusted to release gas under pressure from the control pipe 2 if pressure in the dunnage members 1 should tend to exceed, by more than a chosen slight degree, the dunnage pressure selected as suitable for the nature of the cargo. Then, after the cargo units are loaded, the operator pushes plunger 47 of the interlock valve device 8 for shifting valve 40 against the force of spring 43 to its calibrating position, in which delivery chamber 16 of valve device 6 is cut off from the control pipe 2, and the calibrating volume 10 and gage 46 are connected via valve cavity 42 to pipe 44 and hence to said delivery chamber. While valve device 8 is maintained in its calibrating position, the operator turns the adjusting screw 19 for increasing the adjusted force of regulating spring 17 sufficiently above its minimum to shift the valve member 21 to supply position for conditioning valve device 6 to maintain in the calibrating volume 10 and delivery chamber 16 gas at the pressure, as read on gage 46, selected as suitable for the nature of the cargo units to be shored and sufficient to balance the effective spring force corresponding to the adjusted force of spring 17 less the force of bias spring 24; whereupon the valve member 21 will be shifted to a lap position in which gas will be bottled up in the delivery chamber 16 and volume 10 at such selected pressure.

By cutting off the delivery chamber 16 from the control pipe 2 and connecting said chamber to the calibrating volume 10 and gage 46, in the manner just described, the control valve device 6 may be more quickly, safely and accurately adjusted to maintain a desired pressure than would be possible if no interlock valve device 8 were used and the operator attempted to adjust the control valve device while the control pipe 2 and thus the dunnage members 1 were opened to the delivery chamber 16.

After the control valve device 6 has been adjusted to maintain the pressure selected, the operator releases the plunger 47 of device 8 for causing spring 43 to shift the interlock valve 40 to its normal position, in which it is shown, and in which the delivery chamber 16 of device 6 is reconnected to the control pipe 2 to permit valve device 6 to commence supplying gas to the dunnage members 1, and the gage 46 is connected to pressure tap line 45 so as to read the pressure in the remote end of the control pipe.

To further hasten charging of the dunnage members 1 (since the flow capacity of the control valve device 6 must necessarily be somewhat restricted in order to accurately and sensitively maintain the low pressures used in the dunnage members 1), the operator now preferably shifts plunger 39 of device 7 intermittently against the force of spring 38 for periodically unseating by-pass valve 37 and thus permitting large capacity flow of gas under pressure from the reservoir 12 to pipe 36 and thus control pipe 2 in bypass of control valve device 6, until pressure in the control pipe, as read on the gage 46, has increased to within say a fraction of a p.s.i. below the selected pressure. Final charging of the dunnage members 1 to the selected pressure will thereupon be accomplished solely by way of and at the restricted rate provided by the control valve device 6. The pressure relief valve device 13 will protect against serious overcharging of the dunnage members 1 if the operator should hold the by-pass valve 37 open too long.

If due to changes in ambient temperature or barometric pressure during transit, the pressure in the dunnage members 1 should tend to increase above said selected pressure, such pressure acting in delivery chamber 16 will shift movable abutment 14 downwardly against the force of spring 17 and cause valve member 21 to be shifted correspondingly downward by spring 24 to its release position for releasing gas from the control pipe 2 and dunnage members 1 as necessary to maintain said selected pressure therein; whereas if pressure in the dunnage members and hence in chamber 16 should tend to reduce below said selected pressure, the spring 17 will shift the movable abutment 14 and thereby valve member 21 to supply position for maintaining said dunnage members charged to said selected pressure. Hence, throughout transit, the dunnage members 1 will be constantly maintained charged to said selected pressure.

To unload the cargo at destination, the release valve handle 49 is moved to release position for causing cock 48 to disconnect the control valve device 6 from control pipe 2 and connect the latter to vent port 51 for rapidly deflating the dunnage members 1. The adjusting screw 19 of device 6 should then be backed off until spring seat 20 engages the end wall of chamber 18; whereupon valve member 21 will be shifted to release position by spring 24 for venting delivery chamber 16 in preparation for reloading of the car. Also, prior to reloading of the car, release valve handle 49 should of course be moved back to its normal position to reconnect the control pipe 2 to the pipe 36 and thus the delivery chamber 16.

Having now described the invention, what we claim as new and desire to secure by Letters Patent, is:

1. For controlling the pressures of fluid in a plurality of inflatable dunnage members provided for shoring cargo units in a freight-carrying conveyance and chargeable with gas under pressure from a control pipe having fluid pressure communication with each of the dunnage members: a pressure control system for maintaining the gas in the control pipe and thereby in the interconnected dunnage members substantially constant at a selectable pressure so as thereby correspondingly to maintain constant, irrespective of changes in ambient temperature or barometric pressure, the magnitude of the shoring force exerted by such pressure on the cargo units, said system comprising a reservoir containing gas under pressure, and a self-lapping control valve device including a casing, a regulating spring, manually operable means for adjusting the effective force of said regulating spring, a movable abutment reciprocable in the casing, valve means operatively connected to said movable abutment, and a bias spring, said movable abutment being subject to the combined force of gas under pressure in a chamber open to the control pipe and the force of said bias spring acting in opposition to the adjusted force of said regulating spring, said movable abutment being biased by said bias spring, when said adjusted force is at a minimum and said chamber is vented, to a position for causing said valve means to cut off the reservoir from the control pipe, and said movable abutment being operative when said adjusted force is above said minimum to so control operation of said valve means as to cause the latter to connect said reservoir to the control pipe, bottle up gas under pressure in the control pipe, and release gas under pressure from the control pipe as required to provide in said chamber and thereby in the control pipe and dunnage members gas at the selectable pressure corresponding to the adjusted force of said regulating spring less the force of said bias spring.

2. For controlling the pressure of fluid in a plurality of inflatable dunnage members provided for shoring cargo units in a freight-carrying conveyance and chargeable with gas under pressure from a control pipe having fluid pressure communication with each of the dunnage members: a pressure control system for preselecting and thereafter maintaining the gas in the control pipe and thus in the dunnage members at a selected pressure so as thereby correspondingly to control the magnitude of the shoring force exerted by such pressure on the cargo units, said system comprising a reservoir containing gas under pressure, a self-lapping control valve device comprising an adjustable regulating spring and valve means controlled by the pressure of gas in a chamber opposing the adjusted force of said regulating spring, said valve means being operative to supply gas under pressure from said reservoir to said chamber, bottle up gas under pressure in said chamber and vent gas under pressure from said chamber as required to provide in said chamber fluid at the selected pressure corresponding substantially to the adjusted force of said regulating spring, a calibrating volume, a gage, and interlock valve means interposed between the control pipe and chamber and operable to a position for cutting off the control pipe from said chamber while maintaining the calibrating volume and gage connected to said chamber so as to facilitate preadjustment of said adjusted force and hence measurement of said selected pressure while the control pipe and chamber are disconnected, said interlock valve means thereafter being movable to a normal position for opening said chamber to the control pipe and enabling the control valve device to maintain the control pipe and thereby the dunnage members charged to said selected pressure.

3. For controlling the pressure of fluid in a plurality of inflatable dunnage members provided for shoring cargo units in a freight-carrying conveyance and chargeable with gas under pressure from a control pipe having fluid pressure communication with each of the dunnage members: a pressure control system for preselecting and thereafter maintaining gas in the control pipe and thus in the dunnage members at a selected pressure so as thereby correspondingly to control the magnitude of the shoring force exerted by such pressure on the cargo units, said system comprising a reservoir containing gas under pressure, a self-lapping control valve device comprising an adjustable regulating spring, a bias spring, and valve means controlled by the combined force of gas under pressure in a chamber normally open to the control pipe and the force of said bias spring opposing the adjusted force of said regulating spring, said valve means being operative to supply gas under pressure from said reservoir to said chamber, bottle up gas under pressure in said chamber and vent gas under pressure from said chamber as required to provide in said chamber fluid at the selected pressure corresponding to the adjusted force of said regulating spring less the force of said bias spring, a calibrating volume, a gage, and interlock valve means interposed between the chamber and the end of the control pipe which is ahead of the dunnage members, said interlock valve means being operable to a position for cutting off the control pipe from said chamber and connecting said calibrating volume and gage to said chamber so as to facilitate sensitive preadjustment of said adjusted force and hence measurement of said selected pressure while the control pipe and chamber are disconnected, said interlock valve means normally being biased to a normal position in which said one end of the control pipe is opened to said chamber and said calibrating volume is cut off from said chamber, and said gage is disconnected from said chamber and connected to the opposite end of the control pipe for reading the pressure at the remote end of the dunnage members.

4. For controlling the pressure of fluid in a plurality of inflatable dunnage members used to shore cargo units in a freight-carrying conveyance and chargeable with gas under pressure from a control pipe having fluid pressure communication with each of the dunnage members: a pressure control system for controlling the pressure of gas in the control pipe and thus in the dunnage members so as thereby correspondingly to control the magnitude of the shoring force exerted by such pressure on the cargo units, said system comprising a reservoir containing gas under pressure, a self-lapping control valve device comprising an adjustable regulating spring, a bias spring, and valve means controlled by the combined force of gas under pressure in a chamber normally open to the control pipe and the force of said bias spring opposing the adjusted force of said regulating springs, said valve means being operative to supply gas under pressure from said reservoir to said chamber, bottle up gas under pressure in said chamber and vent gas under pressure from said chamber as required to provide in said chamber and thereby normally in the control pipe fluid at a selected pressure corresponding to the adjusted force of said regulating spring less the force of said bias spring, normally closed by-pass valve means openable to establish a large capacity charging communication between the reservoir and control pipe in bypass of said control valve device, and release valve means operable to disconnect the control pipe from said chamber and establish a large capacity vent communication from the control pipe to atmosphere in bypass of said control valve device so as to enable rapid venting of the dunnage members.

5. For controlling the pressure of fluid in a control pipe, the combination of a reservoir containing gas under pressure, a self-lapping control valve device comprising an adjustable regulating spring, a bias spring, and valve means controlled by the combined force of gas under pressure in a chamber and the force of said bias spring opposing the adjusted force of said regulating spring, said valve means being operative to supply gas under pressure from said reservoir to said chamber, bottle up gas under pressure in said chamber and vent gas under pressure from said chamber as required to provide in said chamber fluid at a selected pressure corresponding to the adjusted force of said regulating spring less the force of said bias spring, a calibrating volume, a gage, another pipe normally open to the control pipe, interlock valve means interposed between said chamber and other pipe and operable to a position for cutting off said other pipe from said chamber while maintaining the calibrating volume and gage connected to said chamber so as to enable sensitive preadjustment of said adjusted force and hence measurement of said selected pressure while the control pipe and chamber are disconnected, said interlock valve means thereafter being movable to a normal position for opening said chamber to said other pipe to cause said control valve device normally to maintain the gas in the control pipe at said selected pressure, normally closed by-pass valve means operative to establish a large capacity charging communication between said reservoir and other pipe in bypass of said control valve device and interlock valve means, and release valve means normally connecting said other pipe to the control pipe and operable to lap said other pipe and establish a large capacity vent communication between said control pipe and atmosphere in bypass of said control valve device.

6. A method of adjusting to and simultaneously maintaining at a desired pressure the pressure of gas in a plurality of inflatable dunnage members which are sandwiched in a deflated condition between adjacent cargo units in a cargo-unit-carrying conveyance and connected to a common pressure control pipe, said method comprising the steps of cutting off fluid communication between the control pipe and a delivery chamber of a self-lapping control valve of the type operative to supply gas under pressure to, bottle up gas under pressure in and release gas under pressure from the delivery chamber as required to maintain in the delivery chamber gas at a pressure corresponding to the adjusted force of an adjustable regulating spring; adjusting the force of the regulating spring so that the control valve will operate to maintain gas at a selected pressure, as read on a gage, in the delivery chamber; and reestablishing fluid communication between the delivery chamber and control pipe to cause all of the dunnage members to be simultaneously charged to and concurrently maintained pressurized to said selected pressure and thus maintain the cargo units shored with a constant shoring force corresponding to said selected pressure irrespective of changes in ambient temperature or barometric pressure.

7. A method of shoring cargo units in a cargo-unit-carrying conveyance comprising the steps of sandwiching inflatable dunnage members in deflated condition between adjacent cargo units and connecting them to a common control pipe during loading of the cargo units in the conveyance; cutting off fluid communication between the control pipe and a delivery chamber of a self-lapping control valve of the type operative to supply gas under pressure to, bottle up gas under pressure in and release gas under pressure from the delivery chamber as required to provide in the delivery chamber gas at a pressure corresponding to the adjusted force of an adjustable regulating spring; connecting the delivery chamber to a gage and to a calibrating volume; adjusting the force of the regulating spring so that the control valve will operate to provide gas at a selected pressure, as read on the gage, in the delivery chamber and calibrating volume; and thereafter reestablishing communication between the delivery chamber and control pipe to cause the dunnage members to be simultaneously charged to and concurrently maintained pressurized to said selected pressure and thus maintain the cargo units shored with a constant shoring force corresponding to said selected pressure irrespective of changes in ambient temperature or barometric pressure.

References Cited in the file of this patent

UNITED STATES PATENTS

| | | |
|---|---|---|
| 2,753,883 | Feilden et al. | July 10, 1956 |
| 2,764,950 | Finnell | Oct. 2, 1956 |
| 2,835,264 | Woodley | May 20, 1958 |
| 2,856,867 | Dasey | Oct. 21, 1958 |